(12) United States Patent
Webb et al.

(10) Patent No.: US 7,005,993 B2
(45) Date of Patent: Feb. 28, 2006

(54) SENSOR APPARATUS AND METHOD FOR DETECTING EARTHQUAKE GENERATED P-WAVES AND GENERATING A RESPONSIVE CONTROL SIGNAL

(75) Inventors: Craig Webb, Montreal (CA); Jean-Pierre Guite, Montreal (CA)

(73) Assignee: Seismic Warning Systems, Inc., Scotts Valley, CA (US)

( * ) Notice: Subject to any disclaimer, the term of this patent is extended or adjusted under 35 U.S.C. 154(b) by 62 days.

(21) Appl. No.: 10/652,654

(22) Filed: Aug. 28, 2003

(65) Prior Publication Data

US 2004/0135698 A1 Jul. 15, 2004

Related U.S. Application Data

(60) Provisional application No. 60/407,128, filed on Aug. 30, 2002.

(51) Int. Cl.
G01W 1/00 (2006.01)
(52) U.S. Cl. .................................. 340/601; 340/690
(58) Field of Classification Search ................ 340/601, 340/678, 683, 690
See application file for complete search history.

(56) References Cited

U.S. PATENT DOCUMENTS

| | | | |
|---|---|---|---|
| 3,691,549 A | | 9/1972 | Wilson |
| 3,696,369 A | * | 10/1972 | Laymon et al. ............. 367/136 |
| 4,300,135 A | * | 11/1981 | Korn et al. ................. 340/690 |
| 4,364,033 A | | 12/1982 | Tsay |
| 4,516,206 A | * | 5/1985 | McEvilly ..................... 702/18 |
| 4,628,299 A | * | 12/1986 | Tate et al. .................. 340/540 |
| 4,689,997 A | | 9/1987 | Windisch |
| 4,764,762 A | | 8/1988 | Almour |
| 4,783,770 A | | 11/1988 | Danbom |
| 4,904,943 A | | 2/1990 | Takahashi |
| 5,001,466 A | | 3/1991 | Orlinsky et al. |
| 5,047,995 A | | 9/1991 | Wells |
| 5,101,195 A | | 3/1992 | Caillat et al. |
| 5,144,598 A | | 9/1992 | Engdahl et al. |
| 5,248,959 A | | 9/1993 | Chern |
| 5,278,540 A | | 1/1994 | Caban-Domenech |
| 5,420,380 A | | 5/1995 | Harben et al. |

(Continued)

FOREIGN PATENT DOCUMENTS

| EP | 0 305 982 | 3/1989 |
|---|---|---|

(Continued)

*Primary Examiner*—Daniel Wu
*Assistant Examiner*—Son Tang
(74) *Attorney, Agent, or Firm*—Buchanan Ingersoll LLP

(57) ABSTRACT

A P-wave sensing apparatus including a printed circuit board having mounted thereon from one to three orthogonally disposed miniature sensors that function as inertia monitoring devices with respect to motion of the external supporting structures, a plurality of amplifying and filtering circuits for amplifying and filtering the outputs generated by the sensors, and a central processing unit responsive to the amplified signals and operative to generate output signals which can be used to drive optical and audible annunciators, automated data recording systems, or other device actuating systems. Each sensor is formed by a thin piezo-electric film sandwiched between two metallization layers and is laminated to a small rectangular sheet of polyester mounted in cantilever fashion with one edge thereof firmly affixed to a supporting circuit board or clamped between two flat, solid layers (such as miniature circuit boards) and then firmly affixed to the main supporting circuit board. A small mass is attached near the free end of the cantilever, improving the inertia sensing capability of the system by increasing the signal-to-noise ratio within the desired frequency range of motion

20 Claims, 5 Drawing Sheets

U.S. PATENT DOCUMENTS

| | | |
|---|---|---|
| 5,489,889 A | 2/1996 | Kambouris et al. |
| 5,539,387 A | 7/1996 | Gitlis et al. |
| 5,563,575 A | 10/1996 | Yamamura et al. |
| 5,625,348 A * | 4/1997 | Farnsworth et al. ........ 340/690 |
| 5,742,166 A | 4/1998 | Park |
| 5,760,696 A | 6/1998 | Sadri et al. |
| 5,801,636 A | 9/1998 | Tatom et al. |
| 5,856,620 A | 1/1999 | Okada |
| 5,910,763 A | 6/1999 | Flanagan |
| 5,929,767 A | 7/1999 | Wallick |
| 5,962,787 A * | 10/1999 | Okada et al. ............ 73/514.32 |
| 6,034,614 A | 3/2000 | Haley |
| 6,038,924 A | 3/2000 | Lee et al. |
| 6,114,967 A | 9/2000 | Yousif |
| 6,138,516 A | 10/2000 | Tillman |
| 6,208,247 B1 * | 3/2001 | Agre et al. ............ 340/539.19 |
| 6,265,979 B1 | 7/2001 | Chen et al. |
| 6,356,204 B1 | 3/2002 | Guindi et al. |
| 6,373,396 B1 * | 4/2002 | Zamfes ...................... 340/690 |
| 6,484,132 B1 * | 11/2002 | Hively et al. ............... 702/190 |

FOREIGN PATENT DOCUMENTS

| | | |
|---|---|---|
| EP | 0 635 732 | 1/1995 |
| FR | 2 569 277 | 4/1985 |
| JP | 59099277 | 7/1984 |
| JP | 05231038 | 7/1993 |
| JP | 05231039 | 7/1993 |

* cited by examiner

SENSOR APPARATUS AND METHOD FOR DETECTING EARTHQUAKE GENERATED P-WAVES AND GENERATING A RESPONSIVE CONTROL SIGNAL

RELATED APPLICATIONS

This application claims priority to U.S. Provisional Application Ser. No. 60/407,128 filed Aug. 30, 2002 and entitled "Sensor Apparatus for Detecting Earthquake Generated P-Waves and Generating a Responsive Control Signal". The content thereof is expressly incorporated by reference into this application.

FIELD OF THE INVENTION

The present invention is directed to apparatus and methods for detection of impending earthquakes and more particularly, to an improved detector and method for discriminating between general seismic vibrations and those which can be identified as precursors to an earthquake.

BACKGROUND OF THE INVENTION

Every year, earthquakes around the world are responsible for the loss of thousands of lives and result in billions of dollars of structural damage, both directly and indirectly, from collateral damage aftermath. Earthquake events, as well as the related damage and losses caused thereby have increased in frequency and magnitude in recent years. For example, in the 1989 Loma Prieta earthquake that devastated portions of the San Francisco Bay Area, much of the damage was caused by systems failures after the earthquake hit. Compounding the direct damages from the actual earthquake, significant property loss resulted from gas-line ruptures and subsequent gas fires, electrical fires and inaccessible water reserves to name just a few. In many cases, emergency vehicles were unable to respond to these crises due to being stranded behind jammed garage doors and gates, the result of structural damage to their buildings.

The magnitude of an earthquake is measured in terms of a Richter scale value. Introduced in 1935 by Charles F. Richter, the Richter scale is a numerical scale for quantifying earthquake magnitude—typically it refers to local magnitude, but for larger quakes, it often refers to surface-wave magnitude. (Currently, large quakes are generally assigned a moment magnitude, which is scaled to be similar, but is based on seismic moment, and a better measure of the energy of an earthquake.) Since the Richter scale is logarithmic, very small earthquakes (microearthquakes) can have a negative magnitude. While the scale has no theoretical upper limit, the practical upper limit, given the strength of materials in the crust, is just below 9 for local or surface-wave magnitudes (and just below 10 for moment magnitudes).

It is well known that when an earthquake occurs, three sets of waves emanate from the point of origin: P (primary), S (shear) and R (Rayleigh). (There are also Love waves; a shear surface wave in addition to the S-wave, shear bulk wave. The speed of the Love waves is intermediate between S and R-waves). The "P-wave", which is non-destructive and imperceptible to humans, is mainly a vertical motion wave that travels faster than the destructive S- and R-waves. More specifically, the P-wave is a compressional body wave; particle movement is parallel to the direction of propagation of the wave. Its speed is 5.5 to 7.2 km/sec in the crust and 7.8 to 8.5 km/sec in the upper mantle. Since P-waves travel about twice as fast as the S waves, they will arrive sooner. The greater the distance from the hypocenter of an earthquake one is, the greater the time differential between the arrival of P- and S-waves. On the West Coast of North America, for example, the speed of travel of the P-waves is approximately 6.2 miles per second. Therefore, if an earthquake were to occur at a depth of approximately 10 miles, and the epicenter was a distance of approximately 50 miles from the detector, an 8 second warning would be possible. It is apparent, of course, that if the earthquake were substantially deeper, larger in terms of magnitude and further away, an even longer warning time would occur. Depending upon the distance from the point of origin, a typical warning on the order of 1 to 25 seconds is possible.

Generally speaking, the P-waves have a natural frequency of approximately 5 Hertz (Hz) while S-waves have a frequency significantly less than the P-waves. The S-waves have a significantly larger amplitude than the P-waves and therefore are the waves that are principally involved in the destruction to structures. As indicated above, P-waves typically travel at a faster rate from the hypocenter to a given locale in comparison with S-waves. Thus, detection of P-waves can provide an early warning of the impending arrival of S-waves at a given location distant from the epicenter.

One of the primary difficulties in earthquake detection relates to the time factor involved in detecting tile P-waves. As will be realized, if P-waves can be detected as early as possible, this provides time for evacuation, etc., of a building or area in order to avoid potential human injury caused by the arrival of S-waves which, as indicated above, are the chief destructive waves transmitted by geological formations.

Devices and systems that provide advance warning of destructive earthquakes by detecting P-waves (the non-destructive primary earthquake waves) are disclosed in U.S. Pat. No. 5,760,696 entitled "Discriminating Earthquake Detector" and in U.S. Pat. No. 6,356,204 entitled "Method and Apparatus For Detecting Impending Earthquakes". Based on advanced sensing technology, these devices can sound an alarm and/or activate Automatic System Response (ASR), thereby minimizing loss of life and property damage.

The prior art also includes various detectors and other arrangements to measure P-waves as a precursor to following S-waves. However, using existing arrangements, it has been difficult to detect P-waves at a distance from the epicenter of an earthquake without incurring large costs. A further problem is that it is often difficult to resolve false alarms from a real earthquake, due to interference in the instrumentation by extraneous local vibrations or other frequencies. It is desirable to provide a detector capable of discriminating between P-waves and ordinary, everyday ground and building tremors unrelated to an earthquake. In particular, detectors mounted to a building should be capable of discriminating between the natural vibration frequencies of the building structure, which are a function of the structure, and frequencies indicative of P-waves. This may be accomplished by means of an information processing unit that stores vibration data and is programmed to discriminate between frequently occurring frequencies and non-regularly occurring frequencies within the range of P-waves.

Typical of the art that has been patented in this field is the to Windisch, U.S. Pat. No. 4,689,997. The reference provides a detector that primarily employs a vertical spring barb mounted on a support. A coupler is supported on the other end of the barb and this coupler is connected through a coil spring to a mass positioned in concentricity with the barb and coupler. The spring and mass components are selected to have a natural resonant frequency corresponding to that of an earthquake tremor or other vibration to be detected. A switching circuit is provided to detonate an alarm once the earthquake frequency is detected. Windisch does not provide an integrated circuit mechanism for detection of earth tremors, but rather relies on a mechanical arrangement in the form of a spring and mass system. As is known, such systems are susceptible to temperature fluctuations that can alter the point at which the apparatus can detect the earthquake frequency, and are often delicate and thus difficult or more expensive to install in large volume. Further, the Windisch arrangement does not appear to provide a system that discriminates between simple extraneous vibration and earthquake caliber frequencies.

Caillat et al., in U.S. Pat. No. 5,101,195, provide a discriminating earthquake detector. The arrangement relies on an electromechanical combination having a cantilevered device with a predetermined mass on one end. During movement of the beam, an electrical signal is generated which, in turn, is useful for detection of P- and S-waves. Similar to the above-mentioned detectors in the prior art, the arrangement provided in this reference would appear to have limited utility in that there is no provision for a comparison between earthquake caliber waves and those which are simply extraneous, such as would be encountered as a result of traffic vibration, mechanical vibration in a building, aircraft vibration, etc.

U.S. Pat. No. 5,001,466, issued Mar. 19, 1991 to Orlinsky et al., provides an earthquake detector employing an electrically conductive liquid switch means among other variations thereof.

However, there remains a need for a highly accurate, relatively inexpensive detector for accurately measuring P-waves and generating a signal which can be used to drive a variety of types of annunciators and actuators.

Briefly, a presently preferred embodiment of the invention includes a printed circuit board having mounted thereon from one to three orthogonally disposed miniature piezoelectric sensors that function in a cantilever mode as inertia monitoring devices, a plurality of amplifying and filtering circuits for amplifying and filtering the outputs generated by the piezo-electric sensors, and a central processing unit responsive to the amplified signals and operative to generate output signals which can be used to drive optical and audible annunciators and device actuating systems. The sensors are formed by a thin piezo-electric film sandwiched between metallization layers and are carried by a small rectangular sheet of polyester having one edge mounted to a PC board. A small mass is attached near the end of the cantilever, improving the inertia sensing capability of the system.

Among the advantages of the present invention is that it includes a small detector which consumes extremely little power.

Another advantage of the present invention is that it provides a relatively low-cost sensor that can be placed in multiple locations at reasonable expense.

Still another advantage of the present invention is that it provides highly accurate detection of earthquake related primary wave (P-wave) motion and generates an output that can be transmitted to remote locations as part of a system dedicated to announcing the impending arrival of an earthquake.

These and other objects and advantages of the present invention will no doubt become apparent to those skilled in the art after having read the following detailed description of the preferred embodiments illustrated in the several figures of the drawing.

IN THE DRAWING

IN THE SPECIFICATION

Figure 1:
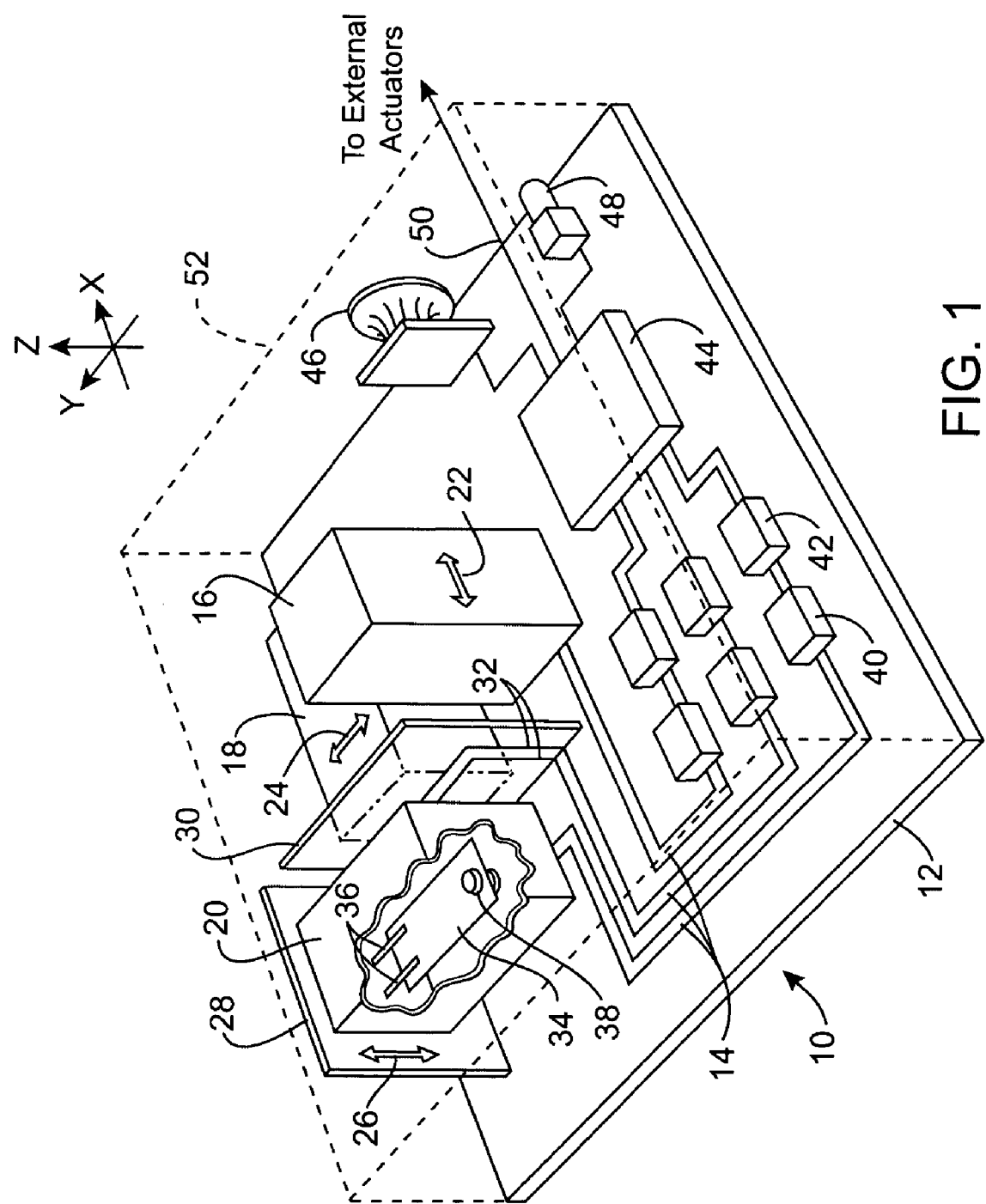
FIG. 1 is a perspective view schematically illustrating a 3-axis P-wave detector in accordance with the present invention.

In FIG. 1, a detector assembly in accordance with the present invention is shown at 10 and includes from 1 to 3 flexible, thin-film, piezo-electric sensor elements that each function in cantilever mode as an inertia monitoring device with respect to earthquake-related primary wave (P-wave) motion of the device in any direction in space, including along X and Y horizontal axes, the Z vertical axis, or any combination thereof. If multiple sensor elements are used as components of a single sensor module, the sensitive axes of the several elements are placed orthogonal to each other and the supports for the elements are rigidly secured together, by virtue of their attachment to a single printed circuit board or by virtue of separate printed circuit boards each having a single mounted sensor attached to the same physical structure (i.e. load bearing wall), so as to move as a unit and provide two or three separate axes of seismic motion detection.

As depicted in FIG. 1, the detector assembly includes a main printed circuit (PC) board 12 having formed thereon a plurality of signal traces 14 for conducting electrical signals between various device components affixed to the board. Mounted on board 12 are three piezo-electric sensor subassemblies 16, 18 and 20, respectively oriented to sense motion in the three orthogonal directions X, Y and Z, as suggested by the double headed arrows 22, 24 and 26. Note that whereas the subassembly 16 is mounted directly to board 12, the subassemblies 18 and 20 are mounted to secondary boards 30 and 28 that are secured to main board 12 and likewise have signal traces, such as indicated at 32, that are ohmically connected to the traces 14 by soldering or appropriate mechanical interconnection.

Within each of the sensor subassemblies 16, 18 and 20, is a thin-film, cantilevered, piezo-electric sensor element 34 having a pair of connector pins 36 mounted to the associated board for supporting, in cantilever fashion, and electrically connecting the associated sensor element to the board to which the assembly is mounted. In accordance with the present invention, the piezo-electric thin-film included in each sensor element is approximately 28 um thick and is about 16 mm long and about 12 mm wide and forms the active part of a laminated sensor to be described in more detail below. The importance of these dimensions and the types of materials used lies not in their exact value as much as in the balance and interplay of factors that come about when they are combined with a small mass in order to maximize sensitivity (i.e., increase the signal to noise ratio), while keeping the P-wave motion-to-signal response as flat as possible within the frequency band of interest, and while also keeping signal ringing (caused by the resilience properties of the sensor material) within the detection band to a minimum. Commercially available sensor elements similar to that to be described herein include the LDTM and newer LDTC type sensors made by Measurement Specialties, Inc. of Norristown, Pa. In accordance with the invention, a certain small mass 38 is attached near the end of the cantilever mounted sensor element, improving the acceleration/inertia sensing capability of the apparatus. Further details of the sensor structure per se will be discussed herein below. Note that each of the piezo-electric sensors is enclosed in a small airtight plastic housing that allows motion necessary to the sensing of earthquake motion yet isolates the sensor from both air temperature and low intensity air motion fluctuations that might otherwise generate signal noise that could adversely affect and interfere with the actual earthquake-related motion readings.

Also mounted to board 12 are a plurality of buffering amplifiers 40 for receiving electrical output signals generated by the piezo-electric sensors via the signal traces 14, and a plurality of amplifier/filter units 42 including analog low-pass and high-pass filters. Signals output by the units 42 are input to a central processing unit (CPU) 44 which processes the signals, and if a P-wave of appropriate amplitude is sensed, generates output signals for driving an audible annunciator 46, or a visual annunciator 48, and/or one or more external actuators via line 50. The sensor and signal processing assembly is contained within a suitable housing affixed to board 12 as suggested by the dashed lines 52.

Figure 2:
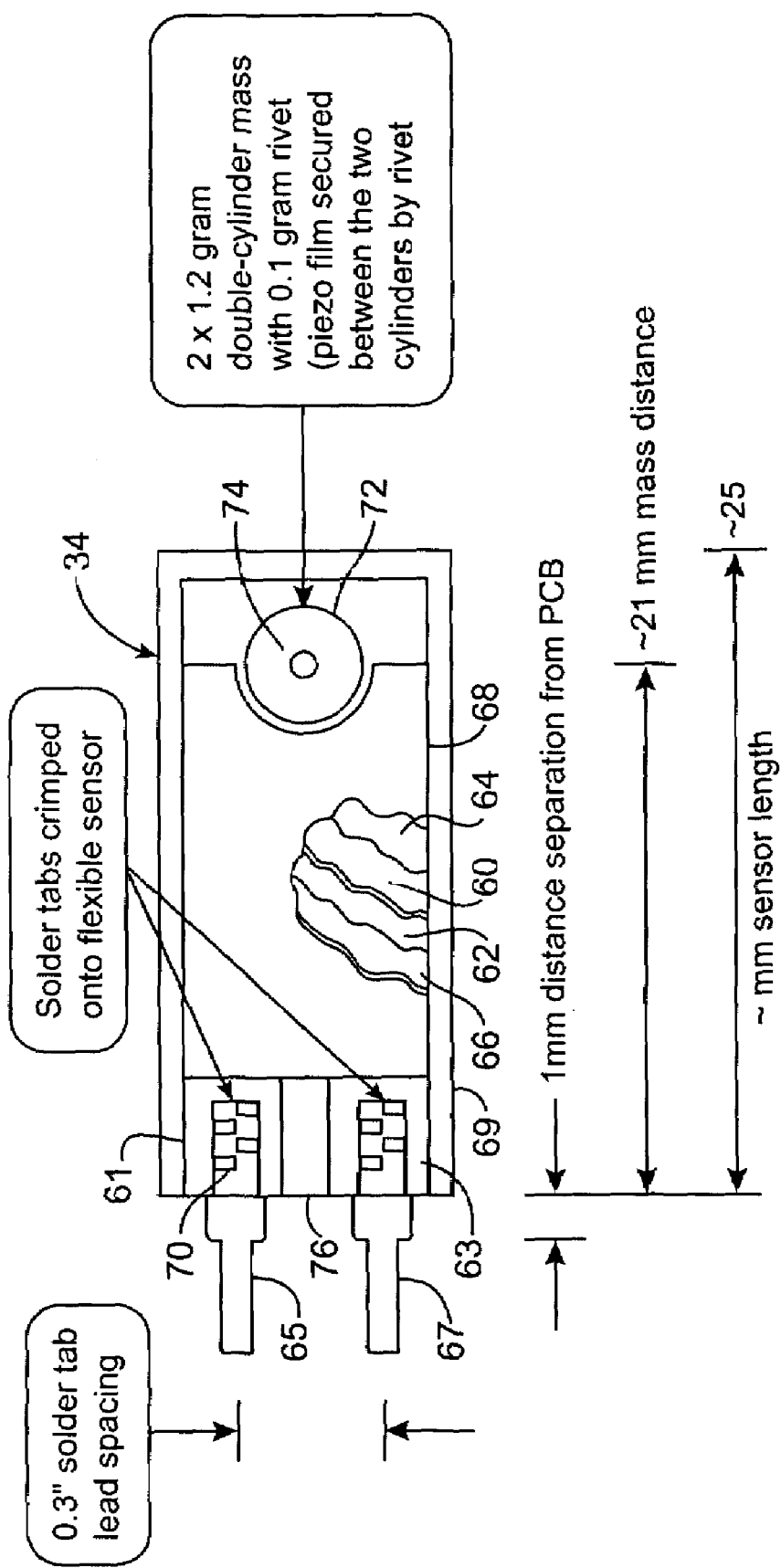
FIG. 2 is a plan view illustrating details of a piezo-electric sensor of the type depicted in FIG. 1.

Turning now to FIG. 2 of the drawing, details of a piezo-electric sensor of the type depicted in FIG. 1 at 34 are illustrated. As suggested above, the sensor is comprised of a thin film 60 (typically 28 um or 52 um in thickness) of piezo-electric material sandwiched between metallization (compliant silver ink or sputtered nickel copper alloy) layers 62 and 64. These three layers are in turn disposed between insulating plastic (urethane) coatings 66 and 68. Since the sensor is very flexible, when intended to be used in a bending mode, these several layers of material, including the piezo film, must be affixed to some type of stiffener. Accordingly, the several layers are laminated to a 0.0025 in. (125 um) polyester sheet or layer 69 that is about 25 mm long and 16 mm wide. This layer stiffens the cantilevered structure enough so that at rest the flexible laminate sensor will lie in a plane determined by the position of the supporting pins 65 and 67. And since the piezo-electric film is now disposed off of the neutral axis of the new laminate, in addition to experiencing bending strain, the film will also experience a slight stretching and compression as the laminate is deflected and will thus develop a much higher voltage output as compared to a film undergoing the simple bending strain it would endure if the piezo material were not laminated to the polyester layer 69. Note that the lower metallization layer 62 includes an extension 63, and the upper metallization layer 64 includes an extension 61. Electrical connection to the metallization layers 62 and 64 is made by means of connector pins 65 and 67 having solder tabs 70 that are driven through the laminate extensions 61 and 63 respectively, and then crimped thereto. To ensure good ohmic connection between the pins and the metallization layers, solder is typically applied to the crimped tabs. At the opposite end of the sensor, a pair of cylindrically shaped 1.2 g weights 72 are respectively secured to the top and bottom of the laminate by means of a single 0.1 gm rivet 74 that is passed therethrough. The center of mass of the combined weights is positioned about 21 mm from the butt end 76 of the laminate.

It will thus be appreciated that with the sensor assembly mounted to a PC board by means of rigid attachment of the pins 65–67 to the board, motion of the board in the direction of the axis of rivet 74 (i.e., the direction normal to the flat surface of the laminate) will tend to bend the cantilevered laminate thereby stressing the piezo-electric material and causing an electrical potential to be developed across the pins 65–67 that is proportional to the induced strain.

Figure 3:
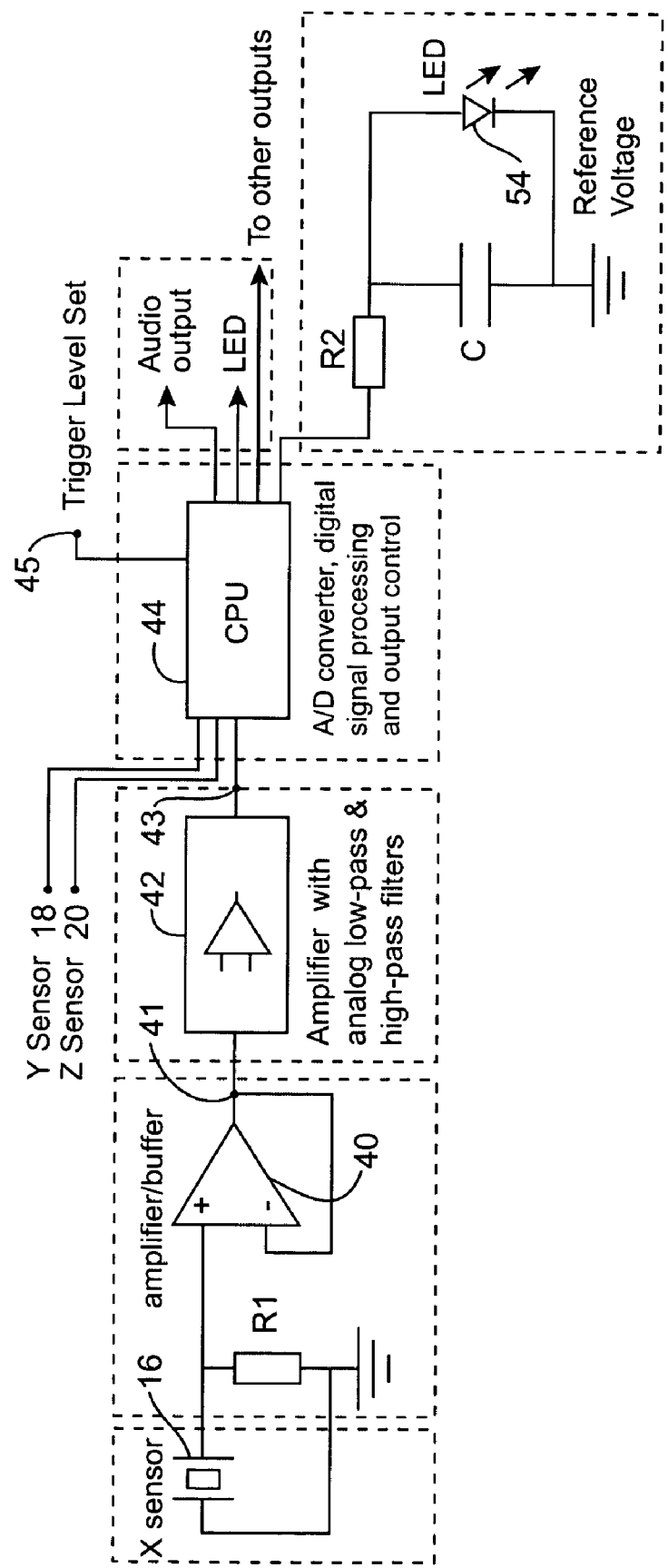
FIG. 3 is a circuit diagram schematically illustrating the principal components of one processing channel of the detector of FIG. 1.

In FIG. 3 of the drawing, a simplified schematic diagram is presented showing a sensor circuit responsive to motion along one of the three axes depicted in FIG. 1. Due to the minute amount of charge (in the picocoulomb range), and the very small current (in microamps) that is created and converted into voltage by flexion of the piezo sensor, the sensing portion of the circuit requires use of an amplifier/buffer with a very high input impedance of at least 100 megohms, and a very high value bias resistor. As described above, the subject invention uses a flexible, piezo-electric sensor in series with the input to an extremely high impedance op-amp, along with a very large resistance connected to ground. The piezo sensor itself, in conjunction with the resistor, acts as an analog high pass (~0.5 Hz and above) filter, with the corner frequency (−3 dB point) being at the lower limit (approximately 0.5 Hz) of possible earthquake primary wave frequencies.

In the schematic circuit of FIG. 3, the X sensor 16 is shown connected across a very high value bias resistor R1 having a resistance value exceeding 10 megohms. Current flowing from the sensor through the resister provides a proportional voltage for input to the amplifier/buffer 40. The resulting output signal developed at 41 is then further amplified and filtered using analog low-pass (0 to ~15 Hz) and high-pass (~0.5 Hz and above) filters 42, and is then input at 43 to one of the three input terminals of a CPU 34 whereupon it is sampled and processed in real-time as described below.

The CPU 44 uses a single polarity voltage supply but reads the input from the motion sensor as an Alternating Current (AC) real-time signal. To make measurements as accurate as possible and to also maximize the resolution over the input range, the CPU monitors the detector input over an extended time span. From this data it separates any motion from the non-motion portion of the input signal, calculates the average signal value, and sets it as the real-time-updated AC zero-point offset for future detector readings. The zero-point is updated in real-time to account for very low frequency voltage offset fluctuations such as temperature variations, or battery voltage drop, over time.

Simple means such as a pushbutton, computer software interface, and/or remote programming means are provided for input at 45 to allow modification of the adjustable ground acceleration and power spectral density output trigger levels as well as the internal digital signal processing filter values that are used by the system to determine the presence (or not) of an impending earthquake. This input (a) allows precise tuning of the device during manufacturer testing, abd (b) ease of customization of the triggering levels to accommodate customer requests and/or different geographical locations and seismic zones.

In order to maintain signal amplitude accuracy independent of battery voltage drops over time which would otherwise affect the CPU's internal analog-to-digital converter resolution, the device requires a voltage reference. The CPU of the preferred embodiment uses a red Light Emitting Diode (LED) 54 as a simple and inexpensive voltage reference, though other more standardized voltage references may be substituted. The value of the reference depends upon the type/color of diode used. In this case, a standard red diode provides a reference voltage of about 1.5V that is used to calibrate the analog-to-digital input of the CPU. The LED also functions as a visual "ON indicator" for the circuit and as a programming feedback source for setting the sensitivity of the unit. The circuit includes a resistor R2 in series with, and a small capacitor C in parallel with, the LED 54. When the LED is powered, the capacitor C is charged to the intrinsic voltage drop of the LED. The CPU output is then flipped to an input for a very short period of time (i.e., before the voltage across the capacitor can discharge) while the reference measurement is made from the voltage across the LED/capacitor pair. This fixed voltage reference is required to maintain signal amplitude accuracy independent of battery voltage drops over time which would otherwise affect the CPU's internal analog-to-digital converter resolution.

Figure 4:
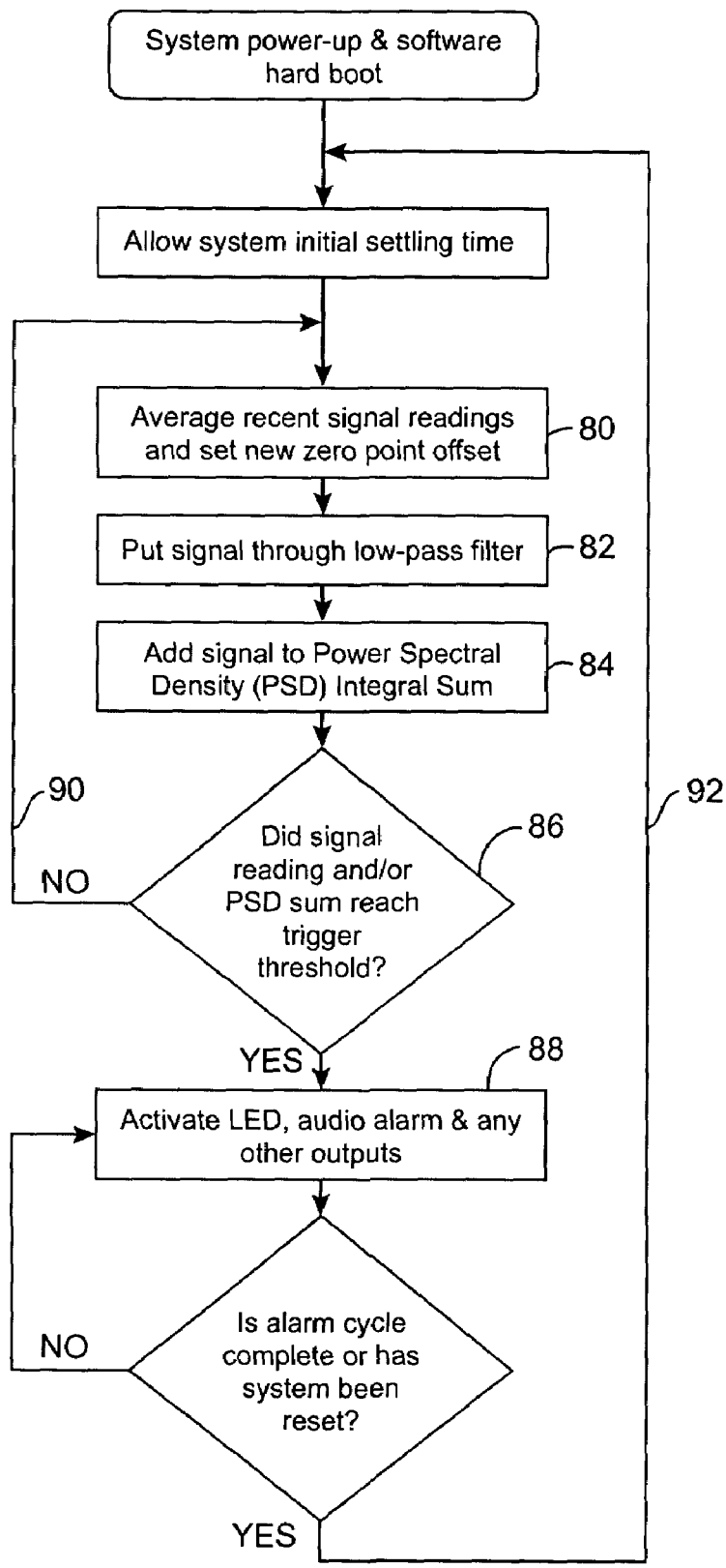
FIG. 4 is a flow chart illustrating operation of the CPU depicted in the embodiment of FIG. 1.

Referring now to FIG. 4, which is a flow chart illustrating the various processing steps executed by the CPU for each orthogonal channel, after the system is powered up and the system software is booted and allowed to settle, real-time digital signal processing is performed on the incoming amplified and partially filtered signals. As pointed out above, the processing includes automatic real-time offset zeroing, as indicated at 80, multiple-order low-pass digital filtering (82), and digital integration (84) that keeps an ongoing sum of the previous few seconds of incoming readings and causes the sum to fall to zero after a few seconds of no signal activity. The real-time automatic offset zeroing is accomplished by averaging the signal over a long period (>10 sec.) in an ongoing manner and taking the ongoing mean as the zero point.

The digitally processed signal is then tested, as indicated at 86, in real-time in two different modes (or a combination of the two) to see whether or not an earthquake P-wave has been sensed. The first mode determines if the ground acceleration (i.e. the incoming signal) rises above a predetermined software programmable level, an acceleration of somewhere between about 0.005 g and 0.1 g, and the second mode determines if the power spectral density (PSDof the incoming processed signal rises above a given software-selectable trigger value within a small window of time (such as a couple of seconds, for example).

If the power spectral density (PSD) of the incoming processed signal rises above the preselected yet easily reprogrammable trigger value within the selected window of time, or if the ground acceleration (GA) rises above a predetermined yet easily reprogrammable level, or if some other combination of the PSD and GA reaches a predetermined level that signifies the presence of a P-wave as determined by the system's real-time seismic activity calculation algorithm, an output is generated, as indicated at 88, to activate the visual alarm (LED), audio alarm and/or control any other appropriate devices.

On the other hand, if the ground acceleration level does not rise above the predetermined level, and the power spectral density value of the incoming processed signal and/or a combination of the GA and PSD does not rise above a pre-selected trigger level within the selected window of time, no output is generated and, as indicated by the line 92, the system is reset and the processing sequence is re-started on the currently incoming signal.

This combined P-wave detection method is far better than previous methods for sensing different types of earthquakes in a wider variety of geographical regions worldwide (especially zones with very low-frequency lower-amplitude P-waves). Furthermore, it also offers the possibility of earlier P-wave detection (i.e. longer warning time) than either method could alone.

As indicated above, once the CPU decides that a p-wave signal from a potentially dangerous earthquake has been sensed, it then triggers one or more of various outputs such as the audio and visual alarms previous alluded to, as well as any of a wide variety of other emergency response alerts, safety/protective devices or systems (including other independent installations of this system), and/or automated equipment shutdown or data backups, whether directly wired, infrared-controlled, wirelessly linked by am or fm (or otherwise modulated) radio waves, or connected via ethernet, telephone, cellular phone, existing building wiring, or through the internet. In addition, upon detection of motion related to an earthquake primary wave (P-wave), the device can be caused to immediately transmit one or more digital or analog pre-recorded voice message(s) or coded or unencoded signal(s) that trigger such voice message(s) to play out loud either directly over loud-speakers, through a connection to an intercom, public address system or amplified speaker module, through telephone, cellular phone, am or fm radio wave broadcast, or by any type of directly wired or wireless audio transmission system. In addition, once a valid P-wave has been detected, the system's automated response capabilities may be used to trigger the closure of one or more gas and/or water shut-off valve(s) and/or the opening or closing of any other type of gas, liquid or chemical flow valve or control mechanism.

Alternatively, upon detection of motion related to an earthquake primary wave, the device can be used to directly or indirectly control an arm or other retaining mechanism, and/or a barrier, shield or other protective mechanism or device that is intended to limit the motion of and/or potential damage to objects, people, animals, etc., in order to reduce the possibility of such objects, people, animals, etc., being damaged or hurt, either by themselves falling or by being hit or crushed by other falling material during an earthquake. Similarly, upon detection of motion related to an earthquake primary wave, the device can operate controls that include but are not limited to an automatic door or garage door opening, closing, locking or unlocking mechanism, the starting of a backup power generator, the transmission of a wireless signal to start a vehicle engine (the latter can be useful in cold countries), as well as trigger the recording or backup of electronically or magnetically stored data.

Figure 5:
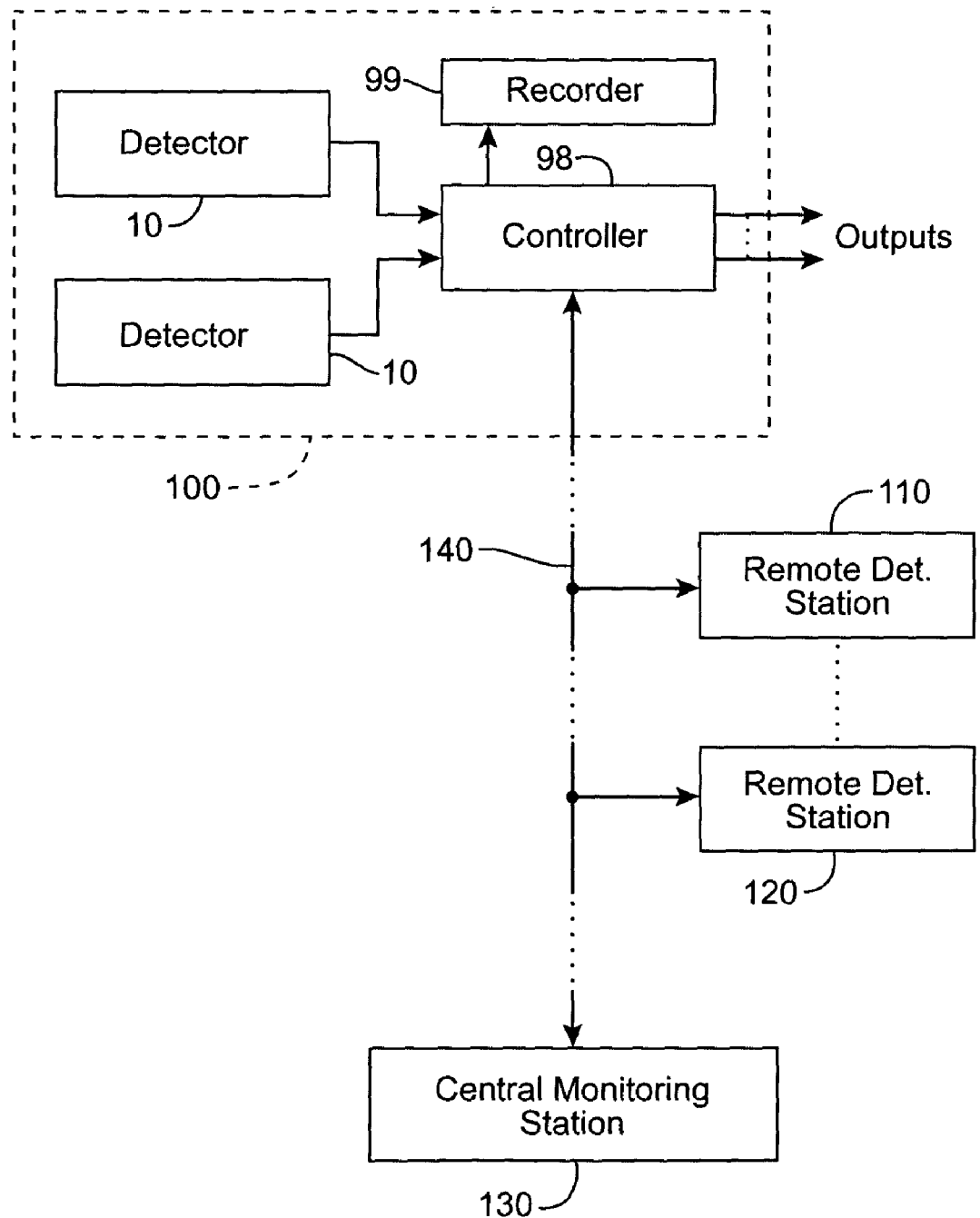
FIG. 5 is a generalized block diagram illustrating use of the present invention in a multiple detector, multiple station system having false signal rejection capability.

In order to avoid false triggering events, a sensor system at a station such as indicated at 100 in FIG. 5 may be used. The system includes two or more of the detector units or sensor modules 10 installed in appropriately separated locations of a monitored structure with their outputs being fed to a controller 98. The controller is adapted to compare detected outputs it received from the detectors 10 and determine whether or not the outputs are such as would likely have been caused by an earthquake P-wave, or are more likely to have been caused by some local disturbance such at a truck passing or a door slamming, etc. For example, whereas a local disturbance is more likely to trigger one but not both of the detectors, an earthquake is more likely to simultaneously trigger both detectors. Accordingly, in response to simultaneous and equivalent signals received from both detector modules, controller 98 will develop output signals that can then be used to drive the desired alarm or other controlled operation. Upon detection of possibly dangerous impending seismic motion, the controller 98 will trigger an internal recorder 99 to record all measured seismic activity detected during a period beginning a small interval before such motion was detected and ending roughly a minute or two after the initial detection of the possibly-dangerous motion. This seismic activity record is stored internally in a physically-protected, non-volatile memory from which it can later be retrieved for verification of the precise level of activity at the exact location of the system. In the case where no external recording method is connected to the system, or in case of a very damaging earthquake that destroys the entire facility, computers and all, this internal record can then act much like an airplane's black box in the case of an airplane accident.

The controller 98 computes in real-time the propagation delay between motion sensed at any given sensor module of a multi-sensor system and the time interval between similar motion appearing at another sensor of the same system but located at some distance from the first sensor. This real-time-monitored propagation delay is extremely valuable information and can be used both to discriminate between seismic activity and extraneous locally-produced vibration noise (in order to reduce false system triggering), and also to allow the system to discriminate between seismic (i.e. ground) motion and strong air motion such as is created during an explosion or violent wind gusts in a storm. This allows the system to also act as a reliable explosion detector for use as an anti-terrorism safety system. Further, when three or more 3-axis sensor modules are mounted at sufficient distance from each other and the propagation delay of sensed activity is monitored between each sensor, the system can perform an advanced calculation using the propagation delay and vertical/horizontal seismic activity ratios to determine with some degree of accuracy the direction of the earthquake in real-time, as well as the depth of its hypocenter or point of origin beneath the earth's surface.

Other sensor systems in detector stations 110, 120 at locations remote from the location of station 100 could also be linked together and to a central monitoring station 130 by a suitable signal transmission or communications medium or network, generally indicated by the broken line 140, so that each station could be immediately informed of a triggering event at a particular station and could take appropriate action, perhaps in advance of it having experienced the oncoming quake event. Similarly, the detected outputs of the several stations can be recorded in real time at a central monitoring station 130 for subsequent analysis.

Alternatively, upon detection of motion related to an earthquake primary wave, the device of the present invention can be used via an ethernet and/or internet connection to automatically send out emails or other electronic communications with information and/or data pertaining to the seismic event, as well as to communicate directly with other remotely located systems either via Ethernet, internet, telephone, cellular phone, or other wireless transmission method for any of the p-wave triggered automated device response purposes mentioned herein, and/or to create a network of monitoring devices which, working together, can calculate the realtime location and direction of a seismic event as well as provide additional early warning time for voice notification and automated device actuation to monitoring nodes in the network that have not yet detected any significant seismic activity.

By way of a specific example, a device in accordance with the present invention and suitably configured for a particular facility, could be programmed to merely alert security and maintenance personnel upon detection of a 4.8–5.0 Richter level, turn on a back-up power generator upon detection of a 5.5–6.0 level, and shut down critical processes upon detection of a level 7.0+ earthquake. The reasoning behind this configuration would be that the early alert and preparatory functions do not have any downside to early deployment, whereas the interruption or shutting down of intricate manufacturing processes, for example, which are more difficult and costly to restart, must be initiated only at a level where there is truly the potential for serious damage. These outputs, and the various levels at which they are triggered are determined through the collaborative efforts of the engineering teams of both the protected facility and the device manufacturer.

As stated above, apparatus in accordance with the present invention constantly monitors ground motion level(s), calculating in real-time the power spectral density of any motion detected, and comparing both the ground acceleration and the PSD against pre-determined valid p-wave trigger levels. Since (a) the magnitude of P-waves generally shows some correspondence with the magnitude of the impending quake, (b) the earlier a P-wave is considered as having been detected, the larger the warning time and automated device activation time before the quake's more dangerous shear and Rayleigh waves arrive, and (c) some types of early warning alerts and automatically activated devices are more critical to trigger and have less cost or other repercussions in the case of false or low-level quake triggering, it is desirable to be able to individually trigger different types of outputs at different P-wave activity levels in order to maximize safety and yet reduce the costs associated with fully triggering all outputs of the system. An example of such implementation would be in a hospital where a low-level P-wave trigger level would activate only voice message alerts for hospital staff, but where medium or higher P-wave activity levels would also trigger the shut-off of gas valves and water flow valves, as well as perhaps starting a backup power generator and trigger the activation of a computer system data backup device. The system described allows for independent and/or dependent output triggering based on completely software-defined logic triggering equations that involve variables including differing seismic activity levels on one or multiple sensors, time delays associated with triggering certain devices (such as closing fire station doors after a seismic event), the activated/non-activated state of other outputs of the system, and/or data received from other remote systems of the same type that are interconnected via internet or other communications linking.

Although the present invention has been described above in connection with a device that uses a single cantilevered piezo-electric sensor module that takes advantage of the inertia of one or more movable, flexible or physically distortable masses located internally or externally to the device in order to monitor the motion, flexion or physical distortion of the mass as it varies in response to sound or shock waves in the air at the point of sensing in any direction in space, including X and Y horizontal axes, the Z vertical axis, or any combination thereof, it will be appreciated by those skilled in the art that various modifications to the above described embodiment may be made, and that the disclosed method of monitoring may alternatively be accomplished using any of a wide variety of other types of sensors in either analog or digital mode or a combination thereof, including but not limited to photosensitive or infra-red sensors, pressure sensors, magnetic or hall-effect sensors, varying resistance sensors (including any variety of potentiometer), varying capacitance sensors and varying inductance sensors. It is therefore intended that this disclosure be interpreted broadly and that the appended claims be construed to cover all such alternatives and modifications as fall within the true spirit and scope of the invention.

What is claimed is:

1. Apparatus for detecting earthquake generated P-waves comprising:

means forming a housing adapted to be mounted to a supporting structure subject to movement by seismic forces;

sensor means affixed to said housing and operative to generate electrical signals proportional to motion experienced by said support structure, said sensor means including multiple sensor elements each of which is responsive to motion in a direction normal to one of a corresponding plurality of mutually orthogonal intersecting planes and operative to generate an electrical signal commensurate therewith, each said sensor element including a thin-film, cantilevered piezo-electric sensor element having an unsupported distal extremity and a proximal extremity rigidly affixed to said housing;

signal amplifying and filtering means responsive to said electrical signals and operative to amplify and pass signals having frequencies within the range of approximately 0.5 to 15 Hz; and signal processing means for sampling the passed signals and for performing an automatic real-time offset zeroing function by averaging the signals over successive periods of time greater than approximately 10 seconds, and for taking the ongoing mean of the averaged signals as the zero point, but causing the sum of the passed signals over any said period of time to drop to a "zero" value after a few seconds of no signal, and for determining that a P-wave has been detected if (a) the averaged signal over a particular one of said periods rises above a predetermined level, and/or (b) power spectral density integrated sum rises above a predetermined trigger value within a predetermined window of time during the particular period, and for generating an output signal commensurate therewith.

2. Apparatus for detecting earthquake generated P-waves as recited in claim 1, wherein each said sensor element has a weight of a predetermined mass affixed to said distal extremity.

3. Apparatus for detecting earthquake generated P-waves as recited in claim 1, wherein said housing includes a printed circuit board including electrical traces interconnecting said sensor means, said signal amplifying and filtering means and said signal processing means.

4. Apparatus for detecting earthquake generated P-waves as recited in claim 3 wherein each said sensor element is enclosed in an airtight enclosure.

5. Apparatus for detecting earthquake generated P-waves as recited in claim 1 wherein said signal processing means includes a user interface for allowing modification of the ground acceleration and power spectral density output trigger levels and the internal digital signal processing filter values that are used by the system to determine the presence of an impending earthquake.

6. Apparatus for detecting earthquake generated P-waves as recited in claim 1 wherein said signal processing means operates by detecting seismic motion and generating corresponding motion signals;

amplifying and filtering said motion signals and passing signals having frequencies within the range of approximately 0.5 to 15 Hz;

performing a real-time offset zeroing function by averaging the signals over successive periods of time greater than approximately 10 seconds and for taking the ongoing mean of the averaged signals as the "zero" point, but causing the sum of the passed signals over any said period of time to drop to a "zero" value after a few seconds of no signal; and determining that a P-wave has been detected if (a) the averaged signal over a particular one of said periods rises above a predetermined level, and/or (b) power spectral density integrated sum rises above a predetermined trigger value within a predetermined window of time during the particular period, and generating an output signal commensurate therewith.

7. Apparatus for detecting earthquake generated P-waves as recited in claim 6 wherein said signal processing means generates a first signal if a detected P-wave has a magnitude falling within a first Richter scale range, and generates a second signal if a detected P-wave has a magnitude falling within a second Richter scale range.

8. Apparatus for detecting earthquake generated P-waves as recited in claim 1 wherein said processing means generates a first signal if a detected P-wave has a magnitude falling within a first Richter scale range, and generates a second signal if a detected P-wave has a magnitude falling within a second Richter scale range.

9. Apparatus for detecting earthquake generated P-waves experienced by a monitored structure, comprising:

sensor means affixed to a housing for attachment to the monitored structure and operative to generate electrical signals proportional to motion experienced by said structure, said sensor means including multiple sensor elements each of which is responsive to motion in a direction normal to one of a corresponding plurality of mutually orthogonal intersecting planes and operative to generate an electrical signal commensurate therewith, each said sensor element including a thin-film, cantilevered piezo-electric sensor element having an unsupported distal extremity and a proximal extremity rigidly affixed to said housing;

signal amplifying and filtering means responsive to said electrical signals and operative to pass signals having frequencies within the range of approximately 0.5 to 15 Hz; and signal processing means for performing real-time digital signal processing on said passed signals, the processing including real-time offset zeroing, multiple-order low-pass digital filtering, and digital integration that keeps an ongoing sum of the previous few seconds of incoming readings and then causes the sum to fall to a zero value after a few seconds of no signal activity, the processing means determining that a P-wave has been detected if (a) the averaged signal over a particular one of a period of the previous few seconds rises above a predetermined level, and/or (b) power spectral density integrated sum rises above a predetermined trigger value within a predetermined window of time during the previous few seconds, and for generating an output signal commensurate therewith.

10. Apparatus for detecting earthquake generated P-waves as recited in claim 9 wherein the real-time offset zeroing is accomplished by repetitively averaging the passed signals over periods of time greater than approximately 10 sec. and taking the ongoing mean as the zero point.

11. Apparatus for detecting earthquake generated P-waves as recited in claim 10 wherein said processing means generates a first signal if a detected p-wave has a magnitude falling within a first Richter scale range, and generates a second signal if a detected P-wave has a magnitude falling within a second Richter scale range.

12. Apparatus for detecting earthquake generated P-waves as recited in claim 9, wherein each said sensor element has a weight member of a predetermined mass affixed to said distal extremity.

13. Apparatus for detecting earthquake generated P-waves as recited in claim 9, further comprising:
a printed circuit board including electrical traces interconnecting said sensor means, said signal amplifying and filtering means and said signal processing means.

14. Apparatus for detecting earthquake generated P-waves as recited in claim 13 wherein each said sensor element is enclosed in an airtight enclosure.

15. Apparatus for detecting earthquake generated P-waves as recited in claim 9 wherein said signal processing means includes a user interface for allowing modification of the ground acceleration and power spectral density output trigger levels and the internal digital signal processing filter values that are used by the system to determine the presence of an impending earthquake.

16. Apparatus for detecting earthquake generated P-waves as recited in claim 9 wherein said signal processing means operates by
detecting seismic motion and generating corresponding motion signals;
amplifying and filtering said motion signals and passing signals having frequencies within the range of approximately 0.5 to 15 Hz;
performing a real-time offset zeroing function by averaging the signals over successive periods of time greater than approximately 10 seconds and for taking the ongoing mean of the averaged signals as the "zero" point, but causing the sum of the passed signals over any said period of time to drop to a "zero" value after a few seconds of no signal; and
determining that a P-wave has been detected if (a) the averaged signal rises over a particular one of said periods above a predetermined level, and/or (b) power spectral density integrated sum rises above a predetermined trigger value within a predetermined window of time during the particular period, and generating an output signal commensurate therewith.

17. A method of detecting earthquake generated P-waves using multiple sensor elements each of which is responsive to motion in a direction normal to one of a corresponding plurality of mutually orthogonal intersecting planes and includes a thin-film, cantilevered piezo-electric sensor element having an unsupported distal extremity and a proximal extremity rigidly affixed to a housing, comprising the steps of:
detecting seismic motion and generating corresponding motion signals using said multiple sensor elements;
amplifying and filtering said motion signals and passing signals having frequencies within the range of approximately 0.5 to 15 Hz;
performing a real-time offset zeroing function by averaging the signals over successive periods of time greater than approximately 10 seconds and for taking the ongoing mean of the averaged signals as the "zero" point, but causing the sum of the passed signals over any said period of time to drop to a "zero" value after a few seconds of no signal; and
determining that a P-wave has been detected if (a) the averaged signal over a particular one of said periods rises above a predetermined level, and/or (b) power spectral density integrated sum rises above a predetermined trigger value within a predetermined window of time during the particular period, and generating an output signal commensurate therewith.

18. A method of detecting earthquake generated P-waves as recited in claim 17 further comprising:
generating a first signal if a detected P-wave has a magnitude falling within a first Richter scale range and;
generating a second signal if a detected P-wave has a magnitude falling within a second Richter scale range.

19. An earthquake detection system comprising:
a plurality of P-wave detection stations respectively disposed in locations remote from each other and communicatively connected together by at least one type of communications medium;
each said station including a pair of P-wave detectors, for attachment to a structure in spaced apart disposition, and a controller responsive to detection signals developed by said detectors and operative to generate alarm signals in the event said detectors both detect a P-wave and simultaneously generate detection signals; and
each said detector including
means forming a housing adapted to be mounted to a supporting structure subject to movement by seismic forces;
sensor means affixed to said housing and operative to generate electrical signals proportional to motion experienced by said support structure, said sensor means including multiple sensor elements each of which is responsive to motion in a direction normal to one of a corresponding plurality of mutually orthogonal intersecting planes and operative to generate an electrical signal commensurate therewith, each said sensor element including a thin-film, cantilevered piezo-electric sensor element having an unsupported distal extremity and a proximal extremity rigidly affixed to said housing;
signal amplifying and filtering means responsive to said electrical signals and operative to amplify and pass signals having frequencies within the range of approximately 0.5 to 15 Hz; and
signal processing means for sampling the passed signals and for performing an automatic real-time offset zeroing function by averaging the passed signals over successive periods of time greater than approximately 10 seconds, and for taking the ongoing mean of the averaged signals as the zero point, but causing the sum of the passed signals over any said period of time to drop to a "zero" value after a few seconds of no signal, and for determining that a P-wave has been detected if (a) the averaged signal rises over a particular one of said periods above a predetermined level, and/or (b) power spectral density integrated sum rises above a predetermined trigger value within a predetermined window of time during the particular period, and for generating a detection signal commensurate therewith.

20. An earthquake detection system as recited in claim 19 and further comprising:
a monitoring station communicatively coupled to said detection stations and operative to record detection signals and/or alarm signals generated by said detection stations.

* * * * *